(12) United States Patent
Mallary et al.

(10) Patent No.: US 8,035,910 B2
(45) Date of Patent: Oct. 11, 2011

(54) READ AFTER WRITE ENHANCEMENT FOR BIT PATTERNED MEDIA

(75) Inventors: Michael L. Mallary, Harmony, PA (US); John W. Vanlaanen, Louisville, CO (US); Ching He, Allison Park, PA (US)

(73) Assignee: Seagate Technology, Cupertino, CA (US)

( * ) Notice: Subject to any disclaimer, the term of this patent is extended or adjusted under 35 U.S.C. 154(b) by 977 days.

(21) Appl. No.: 11/824,137

(22) Filed: Jun. 29, 2007

(65) Prior Publication Data

US 2009/0002868 A1    Jan. 1, 2009

(51) Int. Cl.
*G11B 5/02* (2006.01)
(52) U.S. Cl. ............................................. 360/51
(58) Field of Classification Search .................. None
See application file for complete search history.

(56) References Cited

U.S. PATENT DOCUMENTS

| | | | | |
|---|---|---|---|---|
| 6,151,282 | A * | 11/2000 | Hamada et al. | 369/59.19 |
| 6,963,521 | B2 * | 11/2005 | Hayashi | 369/44.13 |
| 7,492,540 | B2 * | 2/2009 | Albrecht | 360/51 |
| 7,675,703 | B2 * | 3/2010 | Albrecht et al. | 360/51 |
| 2002/0167874 | A1 * | 11/2002 | Hayashi | 369/44.13 |
| 2003/0137767 | A1 * | 7/2003 | Chen et al. | 360/71 |
| 2008/0068754 | A1 * | 3/2008 | Albrecht | 360/135 |
| 2008/0304173 | A1 * | 12/2008 | Albrecht et al. | 360/51 |

* cited by examiner

*Primary Examiner* — Joseph Feild
*Assistant Examiner* — Huy Nguyen
(74) *Attorney, Agent, or Firm* — Braden Katterheinrich

(57) ABSTRACT

A read/write head for use with bit-patterned media detects write synchronization errors between a write clock and the bit-patterned media. In particular, the read/write head writes data to the bit-patterned media using a write clock. The data is then read from the bit-patterned media and used to detect write synchronization errors between the write clock and the location of bit-islands on the bit-patterned media. Based on detected write synchronization errors, the phase associated with the write clock is modified to align the write clock with the location of bit-islands on the bit-patterned media.

20 Claims, 6 Drawing Sheets

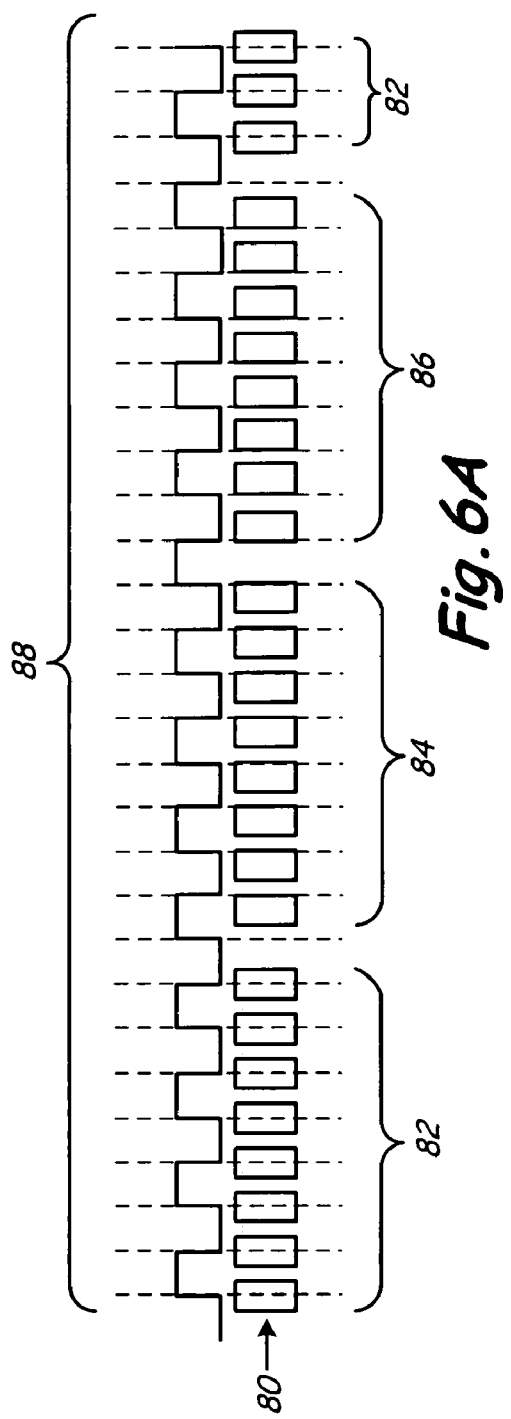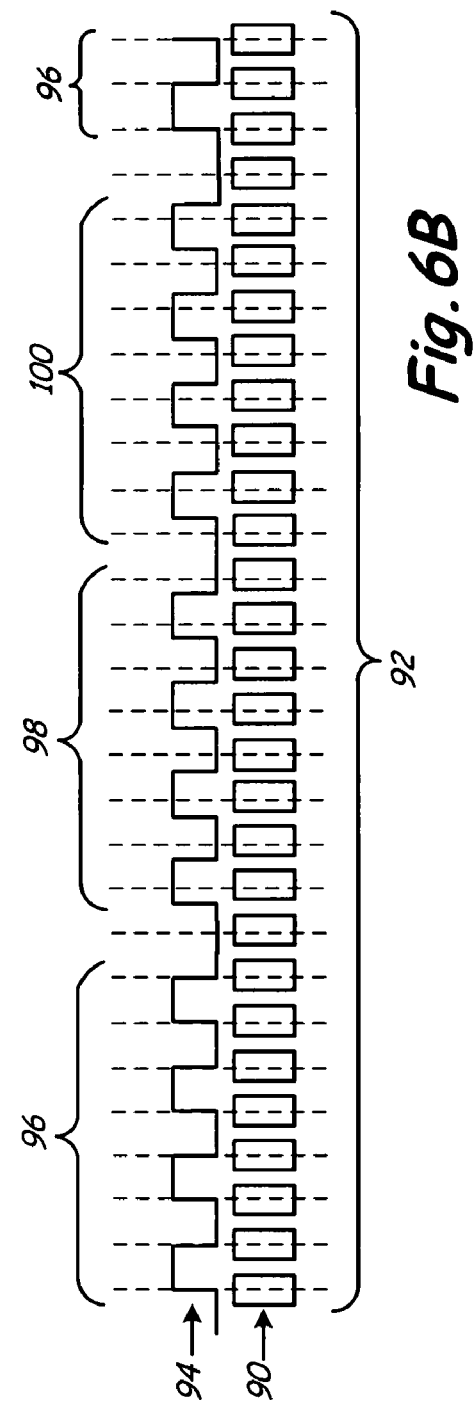

READ AFTER WRITE ENHANCEMENT FOR BIT PATTERNED MEDIA

BACKGROUND

The present invention is related to bit-patterned media, and specifically to read/write heads with read after write capabilities (RAW).

In an effort to continue to increase density associated with magnetic media such as disc drives, traditional "continuous" magnetic media have been replaced with "bit-patterned" media. Unlike traditional continuous magnetic media, in which the magnetic material is uniform, bit-patterned media rely on organizing islands of magnetic material between areas of non-magnetic material. Each island (commonly referred to as "bit-island") acts as a single grain. The areal density can thereby be increased significantly by reducing the volume of the grain without violating the superparamagnetic limit that constrains the areal density of traditional magnetic media.

Along with their potential to increase areal densities beyond the superparamagnetic limit, bit-patterned media based recording systems present a number of specific problems not previously encountered in conventional magnetic media. In particular, bit-island fabrication errors and write synchronization problems present obstacles to reliable storage using bit-patterned media. In conventional magnetic recording systems, there is no need to synchronize the data with the medium during the write process. For this reason, the data is written using a free running clock and sampling instances are recovered during the read process. However, for bit-patterned media, the locations of the bits to be written are predefined (i.e., the bit islands), and this requires a write clock synchronized to the bit island locations. Any mis-synchronization will lead to deletion or insertion of bits while writing. In particular, the deletion or insertion of a bit while writing (sometimes referred to as "cycle slip") may result in the loss of all data following the deleted or inserted bit. In addition, fabrication errors can result in individual bit islands that cannot be written to or read from.

SUMMARY

In one aspect the present invention describes a method of detecting write synchronization errors associated with bit-patterned media. Data is written to the bit-patterned media using a write clock. The data is then read from the bit-patterned media and used to detect write synchronization errors between the write clock and the location of bit-islands on the bit-patterned media. Based on detected write synchronization errors, the phase associated with the write clock is modified to align the write clock with the location of bit-islands on the bit-patterned media.

In another aspect the present invention includes a read/write head for proving read after write functionality. The read/write head includes a writer for writing data to a bit-patterned media and a reader positioned behind the writer such that data written by the writer passes beneath the reader such that the reader can provide real-time verification of data written by the writer. Based on the read-time verification of the data written by the reader, write synchronization errors can be detected and corrected by modifying the phase associated with the write clock.

BRIEF DESCRIPTION OF THE DRAWINGS

FIGS. 6A and 6B illustrate alternative methods of maintaining write synchronization.

DETAILED DESCRIPTION

Figure 1:
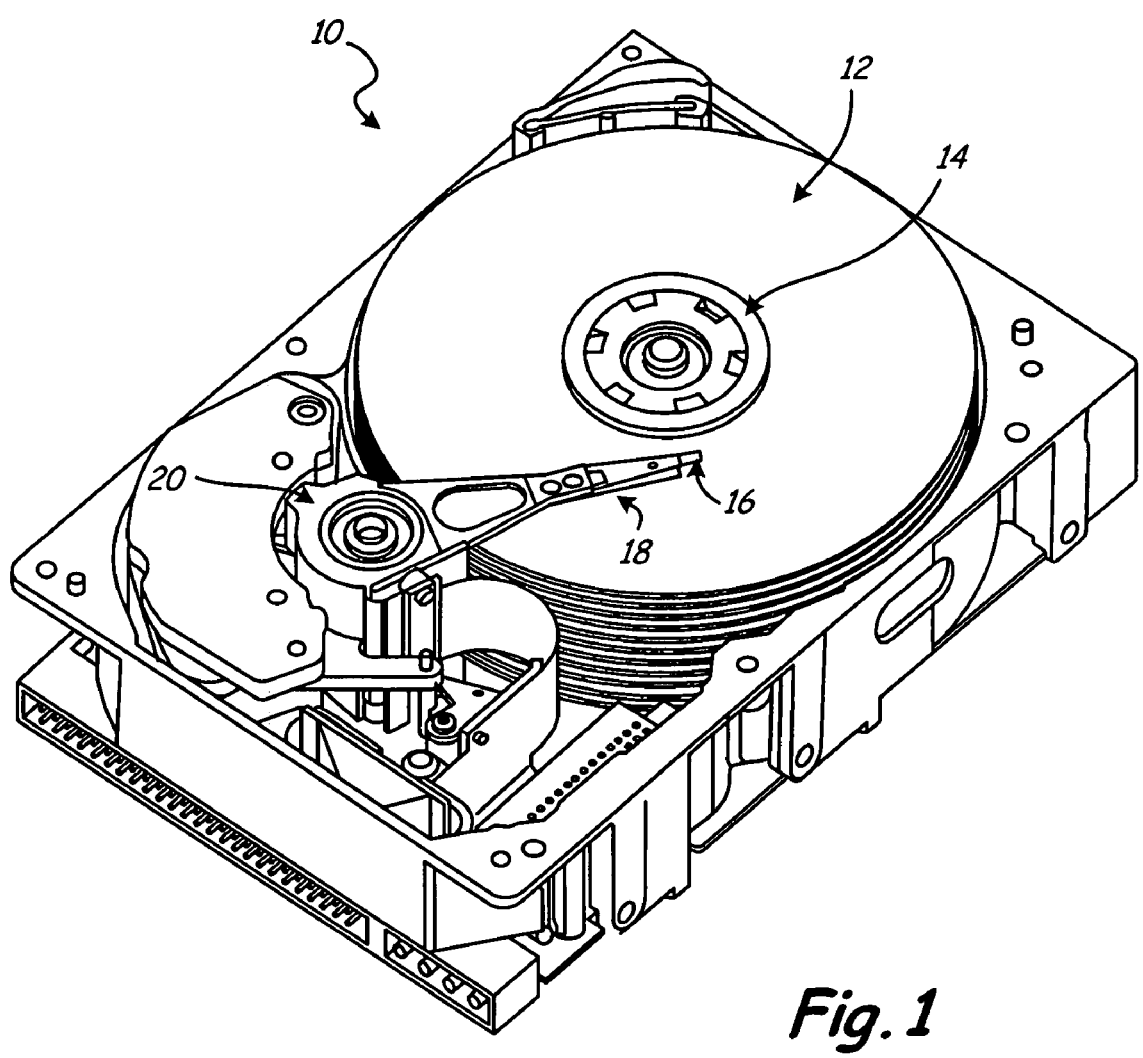
FIG. 1 is a perspective view of a disc drive.

FIG. 1 is a perspective view of disc drive 10, in which an embodiment of the present invention may be employed. Disc drive 10 includes disc pack 12, spindle 14, disc head slider 16, actuator 18, and voice coil motor 20. Disc pack 12 includes one or more individual discs are fabricated using a lithography process described below with respect to FIGS. 2-5 that organizes individual bit-islands and magnetic media for storage of data, commonly known as "bit-patterned media". Data is written to and read from the individual discs by disc head slider 16, wherein each individual disc would be accompanied by an individual disc head slider. The disc head slider is positioned over individual tracks of each disc by actuator 18 and voice coil motor 20. In this way, as spindle 14 rotates the discs, voice coil motor 20 and actuator 18 position the disc head slider over a desired track, such that data can be written to or read from the disc.

Figure 2A:
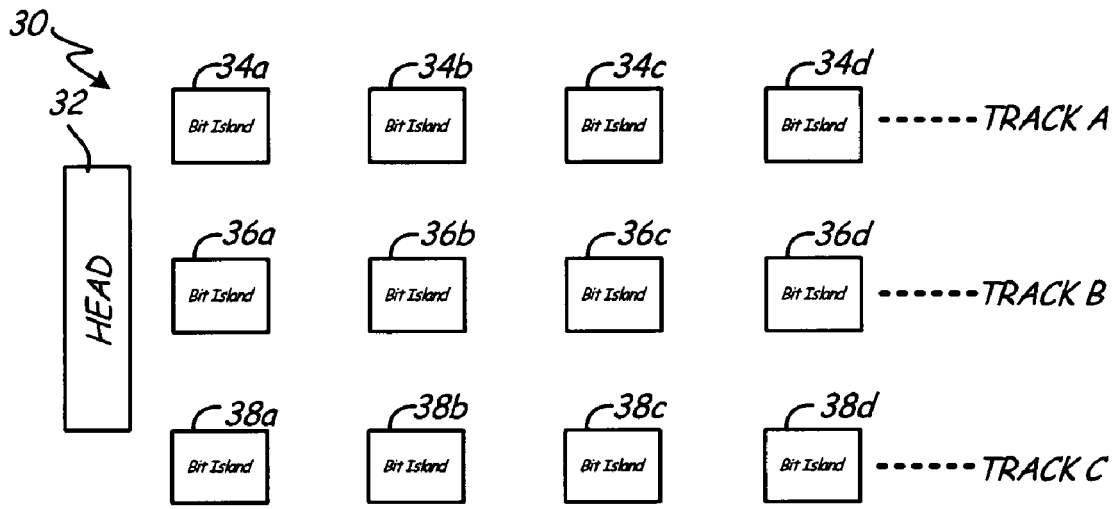
FIGS. 2A and 2B are block diagrams of two embodiments illustrating configurations of bit-patterned media.
Figure 2B:
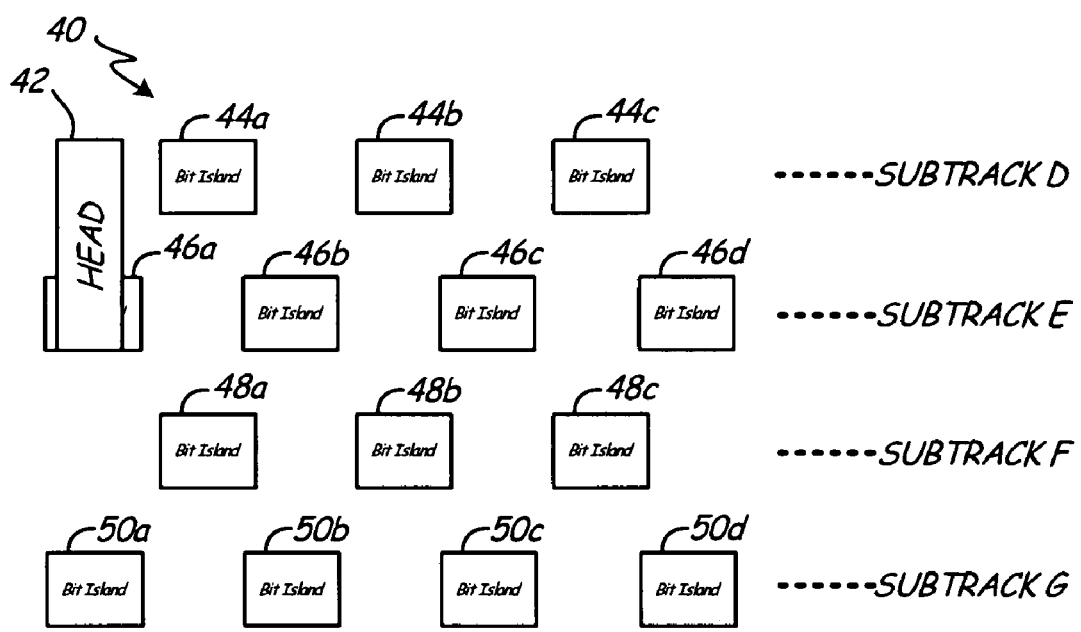

FIGS. 2A and 2B illustrate two possible configurations of bit-islands that may be employed in bit-patterned media. In the embodiment shown in FIG. 2A, bit-patterned media 30 includes a number of bit islands organized into tracks (labeled, track 'A', track 'B' and track 'C'). Read/write head 32 is positioned over one track at a time (for example, in FIG. 2A read/write head 32 is positioned over track 'B'). Each track consists of a number of discrete bit islands organized in grid-like fashion. For instance, track 'A' includes bit islands 34a, 34b, 34c, and 34d, track 'B' includes islands 36a, 36b, 36c, and 36b, and track 'C' includes bit islands 38a, 38b, 38c, and 38d. Writing to a particular bit-island requires not only the correct positioning of read/write head 32 relative to the track being written, but also correct synchronization between the write clock employed by read/write head 32 and the location of the bit-island to be written.

Figure 3:
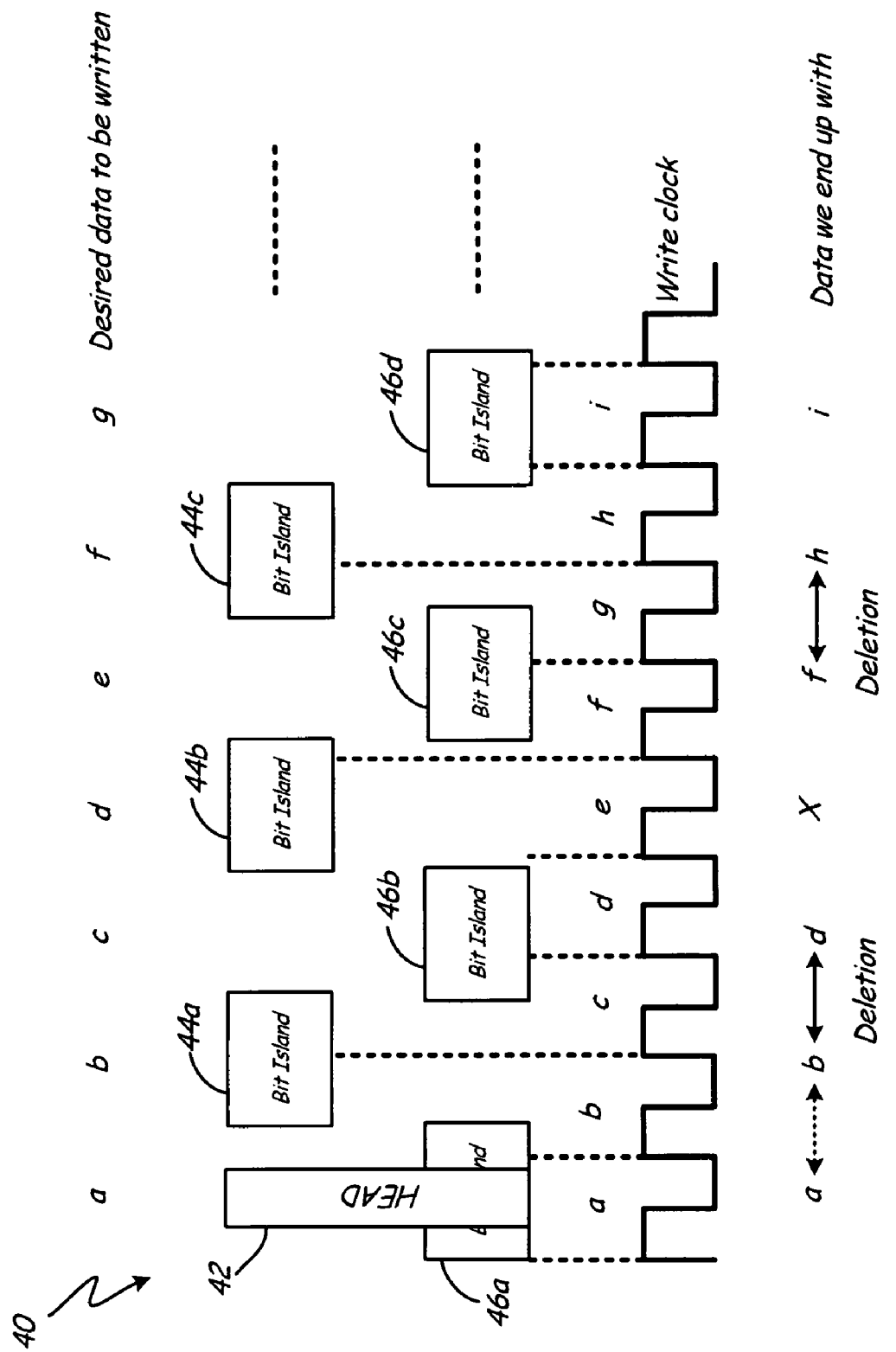
FIG. 3 is a block diagram illustrating write synchronization problems associated with bit-patterned media.

FIG. 2B illustrates another embodiment of the configuration and spacing of bit islands on a bit-patterned media. In this embodiment, bit-patterned media 40 includes a number of bit-islands organized into sub-tracks and tracks. For instance, bit-islands 44a, 44b, and 44c form a first sub-track, and bit-islands 46a, 46b, 46c, and 46d form a second sub-track. As shown in FIG. 3, reader/writer head 42 is positioned over both sub-track 'D' and sub-track 'E', which together form a single track of data. For example, to write data to the first track, read/writer head 42 would write data to the bit-islands in the following order: 46a, 44a, 46b, 44b, 46c, 44c, and 46d. This configuration of bit-islands is referred to as a staggered island configuration. As discussed in more detail with respect to FIG. 3, in order to successfully write to bit-patterned media 40, read/write head 42 must be correctly positioned over the tracks, and the write signal must be properly synchronized with the location of the bit-islands.

The difference between traditional magnetic media and bit-patterned media is that, unlike in traditional magnetic media, writing to bit-patterned media requires knowledge regarding the location of the bit-islands. As described in more detail with respect to FIG. 3, because each bit-island is discrete, problems can arise when read/write head 42 attempts to write data in between bit-islands. This is in contrast with traditional magnetic media, which due to the continuous nature of the media does not pose this problem.

FIG. 3 uses the staggered bit-island configuration described with respect to FIG. 2B to illustrate in more detail the write synchronization problem that can occur in bit-patterned media. In this embodiment, read/write head 42 is positioned to write a series of data (illustrated by the row of letters 'a', 'b', 'C', 'd', 'e', 'f', and 'g') to bit-islands 46a, 44a, 46b, 44b, 46c, 44c, and 46d respectively. Whether data is written to a particular bit-island depends on whether successive rising edges of the write clock signal (labeled 'Write Clock') correspond with the location of a particular bit-island. In this simplified example, a write to a bit-island is only successful if over half of the distance between the successive rising edges of the write clock correspond with the location of the bit-island to be written.

Therefore, between the first rising edge of the write clock and the second rising edge of the write clock, read/write head 42 writes the letter 'a' to a bit-island 46a. Between the second rising edge of the write clock and the third rising edge of the write clock, read/write head 42 writes the letter 'b' to bit-island 44a. In this example, even though a portion of the distance between the second and third rising edges occurs over bit-island 46a, a majority of the distance between the second and third rising edges occurs over bit-island 44a, such that bit-island 44a is written with the letter 'b'. Between the third and fourth rising edges of the write clock read/write head 42 writes the letter 'c' to bit-island 46b. Once again, this is because a majority of the distance between the third and fourth rising edges occurs over bit-island 46b.

In the next write cycle, between the fourth and fifth rising edges of the write clock read/write head 42 writes the letter 'd'. However, because a majority of the distance between the fourth and fifth rising edges of the write clock occurs over bit-island 46b, rather than bit-island 44b, the letter 'c' written in the previous write cycle is deleted and replaced with the letter 'd'. This situation is slightly different than the situation in which data is improperly written to a magnetic media (commonly referred to as a "bit-error"). In this case, the letter 'c' has been effectively lost and each successive write will be shifted over such that detection of the deleted bit is difficult. This problem is commonly referred to as "cycle slip" or "write synchronization error". In particular, the devastating aspect of write synchronization errors is that data written after the deletion or insertion of a bit is uncorrectable. This is in contrast with the situation shown in the next write cycle, in which the letter 'e' is not properly written to bit-island 44b. That is, unexpected data 'X' is instead written to bit-island 44b.

In addition to the specific write synchronization errors discussed above, gradual changes in the synchronization of the write clock to the bit-patterned media can be introduced by a number of factors, such as a change in temperature of the disc drive and corresponding changes in propagation delays associated with read and write signals. Although these changes may be small and gradual, in the aggregate they may result in the write clock becoming slightly misaligned with respect to the bit-patterned media such that the error rate associated with writing to the bit-patterned media begins increasing. Therefore, detecting write synchronization errors is paramount to ensuring reliable storage on bit-patterned media.

The present invention is directed towards embodiments for reading data written to bit-patterned media and based on the data read, detecting the presence of write synchronization errors. In particular, the present invention is directed towards systems and methods of detecting write synchronization errors in real-time using a read after write (RAW) system in which a reader trails a writer and immediately verifies that data written by the writer is correct (i.e., does not contain write synchronization errors). In addition, based on detected write synchronization errors or anticipated write synchronization errors, steps are taken to modify the write clock associated with the writer such that write synchronization errors are minimized or corrected.

FIG. 4 illustrates an embodiment of read/write head 50 capable of implementing read after write. Read/write head 50 includes reader 52, writer 54, top reader shield 55, bottom reader shield 56, and write shield 57. In this embodiment, by positioning reader 52 directly behind writer 54, reader 52 is capable of reading data bits just written by writer 54 (i.e., in real-time). The benefit of real-time RAW (as opposed to delayed RAW systems), is the ability to quickly detect write synchronization problems before entire blocks of data are lost.

Figure 4A:
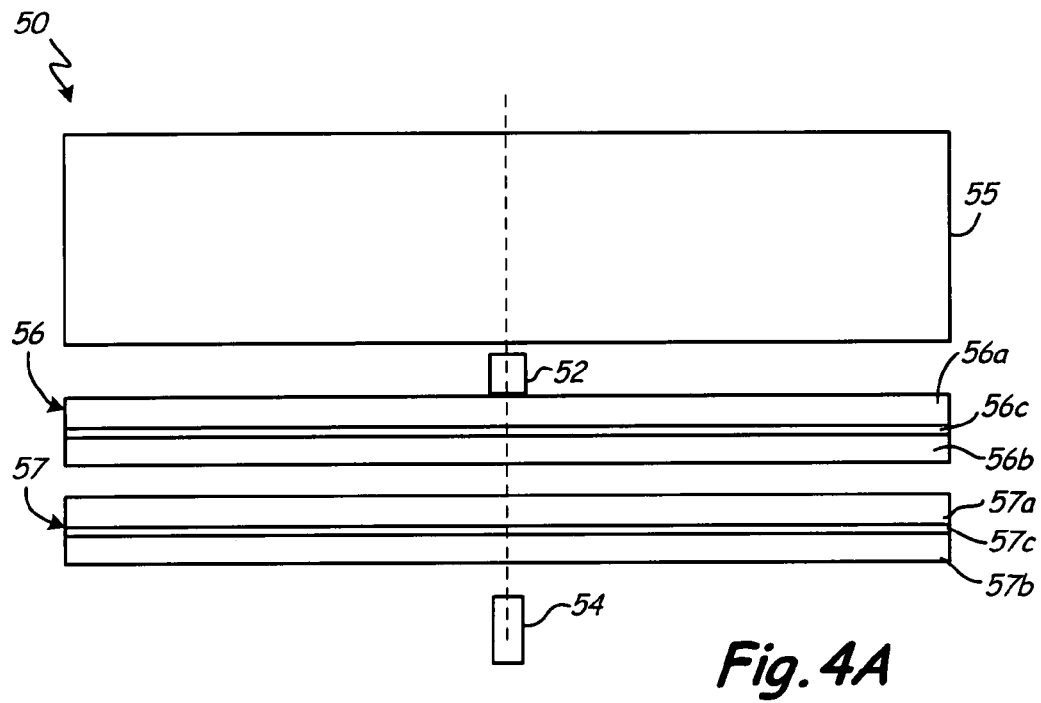
FIGS. 4A and 4B illustrate read/write heads having read after write (RAW) capabilities.

A common problem associated with placing reader 52 directly behind writer 54 is skew sensitivity as a result of a rotary arm (not shown) on which read/write head 50 rests. That is, depending on the track being written, reader 52 may be offset by some amount relative to the track (even assuming writer 54 is correctly positioned over the desired track). In one embodiment, if the skew or skew range associated with read/write head 50 cannot be reduced, the effect of the skew (i.e., skew sensitivity) on reader 52 can be reduced by placing reader 52 as close as possible to writer 54. In this way, reader 52 is maintained over the proper track despite an associated skew range. In the alternative, if the skew range can be minimized then the distance between reader 52 and writer 54 can be increased to decrease the effect of crosstalk between reader 52 and writer 54. In one embodiment, the skew range is decreased by increasing the pivot of the actuator arm relative to the radius of the disc drive (not shown) or by increasing the arm length of the actuator arm relative to the disc drive. In another embodiment, the skew range may be reduced by employing a linear actuator (as opposed to a rotary actuator). Therefore, FIG. 4A illustrates that maintaining reader 52 on the same track as writer 54 for read after write operations requires either minimizing the skew range associated with reader 52 and writer 54, minimizing the distance between reader 52 and writer 54 to offset skew, or a combination of both. In one embodiment, in which a skew range is minimized to between 0.025 and 0.05 radians for a bit patterned media having a density of 1000 ktpi, reader 52 is placed approximately 900 nanometers or less behind writer 54 in order to maintain reader 52 on the same track as writer 54.

Minimizing the distance between reader 52 and writer 54, however, increases the crosstalk between reader 52 and writer 54, which interferes with the ability of reader 52 to successfully read the data. A number of solutions which may be used alone or in combination with one another can be used to decrease or compensate for the effects of crosstalk.

As shown in the embodiment shown in FIG. 4A, bottom reader shield 56 and write shield 57 can be utilized to minimize the effect of cross-talk. In particular, in this embodiment bottom reader shield 56 and write shield 57 are synthetic anti-ferromagnets (SAFs) formed by ferromagnetic layers (56a; 56b and 57a; 57b) that are anti-ferromagnetically coupled with one another by coupling layers 56c, 57c of ruthenium or other coupling material. SAF shield 56 and 57 reduce crosstalk at reader 52.

In another embodiment, the data being written to bit-patterned media (in particular, the signals provided to writer 54 to write the data to the bit-patterned media) are used to compensate for crosstalk seen by reader 52. That is, because cross-talk between writer 54 and reader 52 is deterministic (i.e., knowledge of the write signal can be used to anticipate the expected noise or cross-talk), the write signal generated by writer 54 can be subtracted from the overall signal received by reader 52. In this way, noise or cross-talk caused by writer operations of writer 54 can be subtracted out, such that only the desired read signal remains.

In another embodiment, read/write head 50 takes advantage of the fact that RAW operations do not require the ability to read data at the reliability rate required of traditional readers. Rather, for RAW operations reader 52 is only required to read sufficient data to determine whether a write synchronization error has occurred. Thus, in some RAW systems reader 52 is capable of tolerating substantial amounts of feedback while still verifying the presence or absence of write synchronization errors.

Figure 4B:
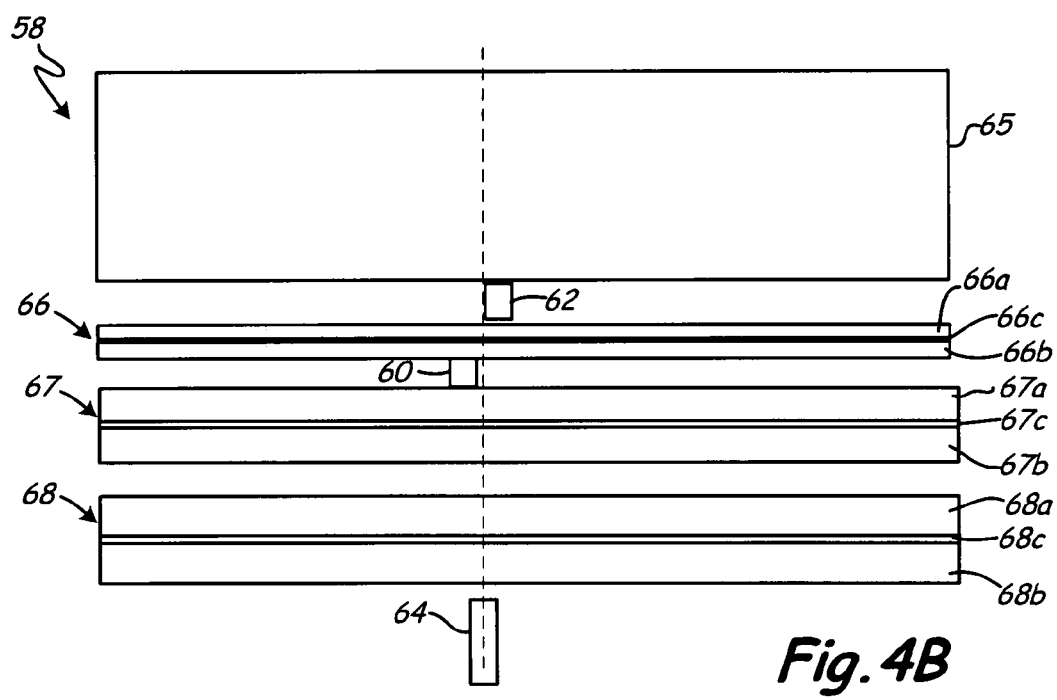

FIG. 4B illustrates an alternative to a read/write head manufactured with a very short distance between the reader and the writer while providing substantial skew sensitivity. In this embodiment, read/write head 58 includes first reader 60 and second reader 62 located behind writer 64 in a ganged read after write configuration (GRAW). Read/write head 58 also includes top shield 65, middle shield 66, bottom shield 67 and writer shield 68. A benefit of this embodiment is the use of two readers improves the skew tolerance between writer 64 and readers 60 and 62, allowing readers 60 and 62 to be placed farther away from writer 64, thus mitigating cross-talk generated by writer 64.

In particular, skew tolerance is improved due to the ability of at least one reader to be positioned over the track of data to be read. For example, assume first reader 60 and second reader 62 have a width of 8 nm and the centerline between the two readers is located directly over the bit-island to be read. In this example, the signal strength obtained by both readers corresponding to the bit island (e.g. 11 nm is width) to be read (i.e., on-track signal) is approximately 60% of the value otherwise obtained if reader 60 was located directly over the bit-island. The combined signal strength corresponding to the bit-island to be read from readers 60 and 62 is therefore 120% of the signal provided by a single reader. If due to skew between writer 64 and readers 60 and 62, the centerline between reader 60 and 62 is 16 nm off track, the first reader (e.g. reader 60) nearest the on-track bit-island will be 8 nm off track, but once again will obtain an on-track signal of 60%. In addition, reader 60 will also obtain a noise signal (i.e., off-track signal) from the track adjacent to the track to be read of, in this example, approximately 20%. However, the second reader (e.g., reader 62 in this example) will be positioned over the track adjacent to the track to be read and the off-track signal obtained from reader 64 can be used to subtract out the off-track signal received by the first reader such that reader 60 is able to read the on-track data as desired. That is, GRAW system employing two read heads improves the skew tolerance of the system and allows readers 60 and 62 to be placed farther away from writer 64 such that the effects of cross-talk are minimized. This allows for successful reads of the on-track data despite the centerline of the readers being off-track slightly.

Another benefit of the GRAW read/write head shown in FIG. 2 is the ability to extract real-time servo information. For example, in one embodiment the ratio of the magnitudes of the on-track signals (i.e., signal strength associated with on-track signal) sensed by the first reader 60 and second reader 62 could be used to calculate a position error signal (PES), which indicates the radial position of read/write head 58 relative to the track being written. For example, if reader 60 measures a magnitude corresponding to 60% of the on-track signal and reader 62 measures a magnitude corresponding to 20% of the on-track signal, then the relative position of read/write head 58 can be determined based on the ratio of these magnitudes. In this example, it could be determined that read/write head 58 was off-track by a determined amount in the direction of reader 62. In another embodiment, the magnitude of the measured cross talk relative to the on-track signal as measured by each reader is used to derive a PES. That is, of the on-track signal measured by reader 60 (as well as reader 62) relative to the off-track signal measured by reader 60 corresponding to an adjacent track (as well as reader 62) can be used to gauge the relative position of read/write head 58. In addition, both the magnitude of the measured cross talk relative to the on-track signal and ratio of on-track amplitudes of the two readers may be used in conjunction with one another to derive the PES. In response, the PES value can be used to improve the on-track position of read/write head 58.

As described above with respect to FIG. 4A, crosstalk between readers and writers can be reduced with shielding. In the embodiment shown in FIG. 4B, readers 60 and 62 float between middle reader shield 66 and bottom reader shield 67. In one embodiment, middle reader shield 66, bottom reader shield 67, and write shield 68 are synthetic anti-ferromagnets (SAFs) formed by ferromagnetic layers (66a, 66b, 67a, 67b and 68a, 68b) that are anti-ferromagnetically coupled with one another by thin coupling layers (66c, 67c and 68c) of ruthenium or similar coupling material. SAF middle shield 66 and bottom shield 67 reduce crosstalk between readers 60 and 62 and between the readers and writer 64. This has the effect of reducing cross-talk between the readers and the writers. In addition, as discussed with respect to FIG. 4A, because crosstalk between the writer 64 and readers 60 and 62 is deterministic (i.e., knowledge of the write signal can be used to anticipate the expected cross-talk), the cross-talk generated by writer 64 can be subtracted from the signal received by readers 60 and 62 to decrease the effect of cross-talk.

In another embodiment, rather than try to read data simultaneously with the writing of data, (which results in potential cross-talk problems), read operations are only performed after the writer has been turned 'off' (i.e., after writing has finished). These embodiments would still require the read head to follow the write head (using either the single reader configuration shown in FIG. 4A or the ganged reader configuration shown in FIG. 4B). However, the readers would only attempt to read the last bits written by the writer at the end of a data string or segment. That is, after writer 54 as shown in FIG. 4A (or writer 64 as shown in FIG. 4B) finishes writing, reader 52 (or readers 60 and 62 shown in FIG. 4B) would read all remaining bit-islands located between reader 52 and writer 54 before coming to the end of the data string or segment. In this way, reader 52 would still be able to provide some indication of whether writer synchronization errors have occurred based on the synchronization measured in the last bits written with respect to a given data string. Depending on the skew range associated with a particular system, it may be beneficial to increase the distance between the writer and the reader in order to increase the number of bits that pass under the reader 52 at the end of a data write segment. This also provides additional time for the magnetics (e.g., cross-talk) to settle such that reader 52 can obtain a clean read signal from the data track being read. For example, if reader 52 is separated from the writer by 800 nm on a BPM having an areal density of 1000 kbpi, this would provide approximately 32 bits at the end of each data stream that could be read without cross-talk and that could provide insight regarding whether any write synchronization errors are present.

Figure 5:
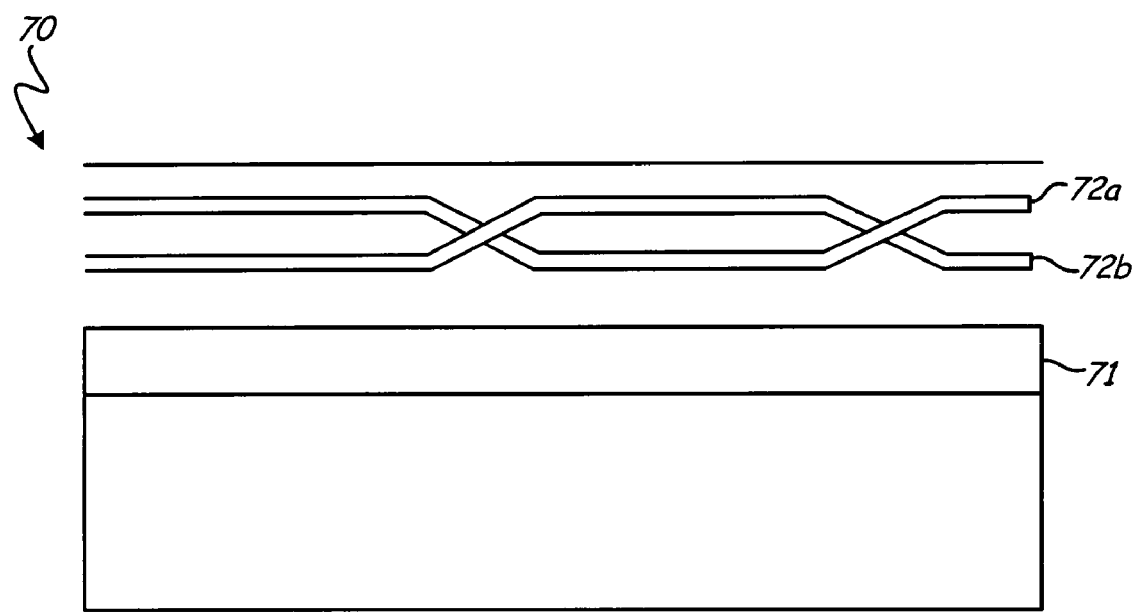
FIG. 5 is a diagram illustrating a flex print.

FIG. 5 illustrates an embodiment of flex print 70 that includes a transmission line configuration for reducing cross-talk. In this embodiment, signal lines 72a and 72b are connected to a reader (such as reader 52 as shown in FIG. 4A or reader 60 or 62 shown in FIG. 4B). To reduce cross-talk between signals provided by the readers, signal lines 72a and 72b are crossed at several points as shown in FIG. 5. Crossing signal lines 72a and 72b acts to offset or average out crosstalk between each signal line. In addition, the same concept can be applied to the signal lines connected to the writer in order to gain a multiplicative reduction in cross-talk on flex print 70.

The embodiments described above that discuss physical solutions to reducing skew and cross talk in order to verify in real-time whether write synchronization errors are present. FIGS. 6A and 6B illustrate two techniques that can be used to predict and preemptively correct write synchronization problems.

FIG. 6A shows a side view of bit-islands on bit-patterned media 80. In this embodiment, BPM 80 consists of normally positioned bit-islands 82, early shifted bit-islands 84, and late shifted bit islands 86. The majority of BPM 80 would consist of normal positioned bit-islands 82. Early shifted bit-islands 84 and late shifted bit-islands 86 are used to test the synchronization of write clock 88 to the normally positioned bit-islands 82. In particular, write clock 88 can be synchronized with normally positioned bit-islands 82 by testing the write clock on early-shifted bit-islands 84 and late-shifted bit islands 86 and detecting failures in one or the other. Based on which type of shift in bit-island location fails (either early-shifted or late-shifted), adjustments can be made to write clock 88 to improve the synchronization between normally positioned bit islands 82 and write clock 88.

Likewise, FIG. 6B shows a side view of bit-islands on bit-patterned media 90. In this embodiment, BPM 90 consists of only normally positioned bit-islands 92. However, in this embodiment write clock 94 is manipulated to provide either normal write timing 96, early shifted write timing 98, or late shifted write timing 100. Once again, the changes to write clock 94 is used to test the synchronization of write clock 94 to bit-islands 92. Write synchronization problems associated with either the early-shifted write clock or the late-shifted write clock can be utilized to fine tune the phase associated with the normal write synchronization clock. Once again, tuning of the write clock consists of applying the early shifted write clock and late shifted write clock to the normally positioned bit islands and detected which shift in the write clock results in write synchronization errors. Based on a detected error, the position or phase of normally positioned write clock 96 can be modified to be properly tuned to bit islands located on bit-patterned media 90.

Although the present invention has been described with reference to preferred embodiments, workers skilled in the art will recognize that changes may be made in form and detail without departing from the spirit and scope of the invention.

The invention claimed is:

1. A method for detecting write synchronization errors, the method comprising:
    writing data to a bit-patterned media with a read/write head responsive to a write clock, the bit-patterned media includes normally-positioned bit-islands, early-positioned bit-islands shifted in a first direction relative to the normally-positioned bit-islands, and late-positioned bit-islands shifted in a second direction relative to the normally-positioned bit-islands;
    reading the written data with a first reader trailing a writer on the read/write head;
    detecting write synchronization errors associated with the write clock being out of phase with the location of the normally-positioned, early-positioned, or late-positioned bit-islands on the bit-patterned media; and
    modifying the phase of the write clock based on detected write synchronization errors.

2. The method of claim 1, wherein the first reader provides read after write (RAW) verification of the data written by the writer.

3. The method of claim 2, wherein a distance separating the writer from the first reader is minimized to reduce effects of skew between the writer and the first reader such that the first reader is positioned as close as possible to a track written by the writer.

4. The method of claim 2, wherein reading data written to the bit-patterned media includes:
    subtracting noise associated with the data currently being written by the writer to reduce cross-talk between the first reader and the writer.

5. The method of claim 2, wherein reading data written to the bit-patterned media includes:
    reading only that data written to the bit-patterned media that passes under the first reader following the writer ceasing to write data to the bit-patterned media.

6. The method of claim 1, further comprising
    a second reader behind the writer and radially offset from the first reader such that the first reader and the second reader provide read after write (RAW) verification of the data written by the writer.

7. The method of claim 6, further including:
    generating error positioning signal regarding the radial position of the read/write head based on a ratio of magnitudes of on-track signals measured by both the first reader and the second reader.

8. The method of claim 6, further including:
    generating error positioning data regarding the radial position of the read/write head based on a magnitude of cross talk relative to an on-track signal as measured by both the first reader and the second reader.

9. The method of claim 1, wherein reading data written to the bit-patterned media to detect write synchronization errors associated with the write clock being out of phase with the location of bit-islands on the bit-patterned media includes:
    reading the data written to the early-positioned bit-islands and the data written to the late-positioned bit-islands to detect write synchronization errors based on the success or failure to write bits to either the early-positioned bit-islands or the late-positioned bit-islands.

10. The method of claim 9, wherein modifying the phase of the write clock based on detected write synchronization errors includes:
    modifying the phase of the write clock based on the success or failure to write bits to either the early-positioned bit-islands or the late-positioned bit-island such that the write clock is properly phased with the normally-positioned bit-islands of the bit-patterned media.

11. The method of claim 1, wherein writing data to the bit-patterned media with a write clock includes:
    modifying the phase of the write clock to include a normally-phased write clock, an early-phased write clock, and a late-phased write clock.

12. The method of claim 11, wherein reading data written to the bit-patterned media to detect write synchronization errors includes:

reading the data written to the bit-patterned media with the early-phased write clock and the data written to the bit-patterned media with the late-phased write clock to detect write synchronization errors based on the success or failure to write bits with the early-phased write clock or the late-phased write clock.

13. The method of claim 12, wherein modifying the phase of the write clock based on detected write synchronization errors includes:

modifying the phase of the write clock based on the success or failure to write bits with the early-phased write clock or the late-phased write clock.

14. A read/write head for providing read after write functionality, the read/write head comprising:

a writer for writing data to a bit patterned media;

a first reader for reading data stored to the bit patterned media and positioned behind the writer such that the first reader can provide real-time verification of data written by the writer;

a synthetic anti-ferromagnetic write shield located between the first reader and the writer; and a synthetic anti-ferromagnetic reader shield located between the write shield and the first reader.

15. The read/write head of claim 14, wherein a distance separating the write from the first reader is minimized to reduce effects of skew between the writer and the first reader such that the first reader is positioned as close as possible to a track written by the writer.

16. The read/write head of claim 14, wherein the cross-talk between the writer and the first reader is reduced by subtracting noise associated with the data currently being written by the writer.

17. The read/write head of claim 14, wherein the first reader only reads data subsequent to the write head ceasing write operations, wherein the first reader verifies all remaining data that passes under the first reader.

18. The read/write head claim of 14, further including:

a second reader offset radially from the first reader, wherein the first reader and the second reader work in conjunction to read the data written by the writer in a ganged read after write configuration.

19. The read/write head of claim 18, wherein an error positioning signal regarding the radial position of the read/write head is determined based on a ratio of off-track signals measured by the first reader and the second reader.

20. The read/write head of claim 18, wherein error positioning data regarding the radial position of the read/write head is determined based on a ratio of on-track signals measured by the first reader and the second reader.

* * * * *